US012476034B2

(12) United States Patent
Dubois et al.

(10) Patent No.: US 12,476,034 B2
(45) Date of Patent: Nov. 18, 2025

(54) INDUCTIVE FILTERING DEVICE LIMITING HEAT GENERATION

(71) Applicant: THALES, Courbevoie (FR)

(72) Inventors: Eric Ravindranath Dubois, Chatou (FR); Hocine Kherbouchi, Chatou (FR); Stéphane Guguen, Chatou (FR)

(73) Assignee: THALES, Courbevoie (FR)

( * ) Notice: Subject to any disclaimer, the term of this patent is extended or adjusted under 35 U.S.C. 154(b) by 1122 days.

(21) Appl. No.: 17/383,078

(22) Filed: Jul. 22, 2021

(65) Prior Publication Data

US 2022/0028594 A1 Jan. 27, 2022

(30) Foreign Application Priority Data

Jul. 27, 2020 (FR) ....................................... 2007872

(51) Int. Cl.

| | |
|---|---|
| ***H01F 27/06*** | (2006.01) |
| ***H01F 27/08*** | (2006.01) |
| ***H01F 27/24*** | (2006.01) |
| ***H01F 27/28*** | (2006.01) |

(52) U.S. Cl.
CPC ............. *H01F 27/08* (2013.01); *H01F 27/24* (2013.01); *H01F 27/2823* (2013.01); *H01F 27/2885* (2013.01)

(58) Field of Classification Search
CPC ...... H01F 27/28; H01F 27/24; H01F 27/2823; H01F 27/288; H01F 27/2885; H01F 17/00; H01F 17/0033; H01F 17/04; H01B 9/028; H01B 9/02; H01B 9/006
USPC .................................................. 333/181, 185
See application file for complete search history.

(56) References Cited

U.S. PATENT DOCUMENTS

| | | | | |
|---|---|---|---|---|
| 11,562,843 | B2 * | 1/2023 | Dubois | .................... H03H 1/00 |
| 11,715,589 | B2 * | 8/2023 | Dubois | ................ H02M 5/458 336/221 |
| 2001/0050605 | A1 | 12/2001 | Sugiura et al. | |
| 2016/0365192 | A1 | 12/2016 | Ohdaira | |

* cited by examiner

*Primary Examiner* — Hai L Nguyen
(74) *Attorney, Agent, or Firm* — BakerHostetler

(57) ABSTRACT

An inductive filtering device includes a magnetic core at least one electrical cable wound around the magnetic core so as to form at least one turn, the electrical cable being intended to convey an electrical signal possessing at least one undesirable AC component superposed on a fundamental frequency of the electrical signal, and an electrically conductive screen that is electrically insulated from its environment, the screen being placed between the magnetic core and the electrical cable so as to allow, in the screen, via electromagnetic induction, a current to be generated the frequency of which is higher than the fundamental frequency, the screen being configured so as not to allow a current to flow in a direction parallel to that of the one or more turns formed by the winding of the electrical cable around the magnetic core.

8 Claims, 3 Drawing Sheets

INDUCTIVE FILTERING DEVICE LIMITING HEAT GENERATION

CROSS-REFERENCE TO RELATED APPLICATIONS

This application claims priority to foreign French patent application No. FR 2007872, filed on Jul. 27, 2020, the disclosure of which is incorporated by reference in its entirety.

FIELD OF THE INVENTION

The invention relates to an inductive filtering device. This type of filtering is commonly used to decrease potential interference present on a signal conveyed by an electrical cable. The device is then placed in series on the cable. The invention is particularly useful in the field of aeronautics, in which the current trend is to increase the number of pieces of electrical equipment and therefore the number of filtering devices associated with these pieces of equipment. In this field, decreasing the on-board weight is an ongoing problem. The invention proposes to decrease the weight of filtering devices.

BACKGROUND

Conventionally, a filtering device may be formed by an inductor connected in series to an electrical conductor. The value of the impedance of an inductor is proportional to the frequency of the current flowing through it. An inductor is therefore very suitable for filtering the high-frequency components of the current flowing through the electrical conductor.

The inductor may be produced by means of an electrical conductor wound around a magnetic core allowing the magnetic flux induced by the current flowing through the electrical conductor to be channeled. In order to optimize the flow of the magnetic flux, it is possible to employ a gapless closed magnetic core. This type of core is referred to as "toroidal" by many manufacturers. It is formed around a central void. The qualification toroidal as regards the magnetic core goes way beyond the mathematical definition of a toroid. In particular, magnetic cores are found that are said to be toroidal but that are of circular cross section, rectangular cross section, etc. The inductor is produced by winding an electrical conductor around the magnetic core and through the central void in order to form one or more turns.

The applicant has observed that, when filtering harmonics of a current the fundamental component of which is low-frequency, the harmonics, and more generally high-frequency components, superpose on the fundamental component of the current, generating large induced electrical currents in the magnetic core. Specifically, although the materials of the magnetic cores are chosen for their magnetic properties, and in particular for their permeability, they are also conductors of electricity. This electrical property allows induced currents to be generated. The higher the frequency of the current flowing through the conductor, the larger the induced current.

These large currents flow exclusively through the magnetic core without exiting therefrom and generate Joule heating. Now, the more the temperature of a core increases, the more the magnetic permeability of the material of the core decreases, this leading to a decrease in the inductance of the inductor and therefore an increase in the current flowing through the conductor, in particular as regards its high-frequency components. This increase in the current generates a larger induced current and therefore greater heating. The applicant has even observed, in certain cases, thermal runaway able to lead to the destruction of the magnetic core.

To limit heating of magnetic circuits, it would be possible to employ magnetic cores made from materials possessing a high electrical resistivity. However, their magnetic characteristics are far worse than those of conventional magnetic cores.

The heat produced in a magnetic core may be removed by increasing the volume of the magnetic core in order to increase its area of contact with ambient air. It is also possible to make provision for a heat sink to be fastened to the core. Whatever the solution adopted as regards heat removal, it leads to an increase in the weight and volume of the inductor.

SUMMARY OF THE INVENTION

One aim of the invention is to decrease the weight and volume of an inductor employing a magnetic core. This aim is achieved by limiting the appearance of high-frequency current in the magnetic core around which the conductor of the inductor is wound.

To limit the appearance of high-frequency current in the magnetic core, a conductive screen is placed between the conductor of the inductor and the magnetic core. The function of this screen is to move the generation of looped induced currents from the magnetic core to the screen. The induced currents oppose those flowing through the conductor. Thus, the magnetic core is subjected to two opposed currents, this tending to decrease the magnetic flux and therefore the induced currents able to flow through the magnetic core. In other words, the presence of the screen allows the appearance of induced currents in the magnetic core and therefore the heating thereof to be very greatly decreased.

More precisely, the subject of the invention is an inductive filtering device comprising:

- a magnetic core
- at least one electrical cable wound around the magnetic core so as to form at least one turn, the electrical cable being intended to convey an electrical signal possessing at least one undesirable AC component superposed on a fundamental frequency of the electrical signal, and
- an electrically conductive screen that is electrically insulated from its environment, the screen being placed between the magnetic core and the electrical cable so as to allow, in the screen, via electromagnetic induction, a current to be generated the frequency of which is higher than the fundamental frequency,
- the screen being configured so as not to allow a current to flow in a direction parallel to that of the one or more turns formed by the winding of the electrical cable around the magnetic core.

When the device is intended to filter a given frequency, the screen advantageously possesses a thickness at least equal to $\delta=(\rho/\pi\cdot f\cdot\mu)^{1/2}$ with ρ: the resistivity, and μ: the absolute magnetic permeability of the material chosen to produce the screen.

In a first embodiment of an inductive filtering device according to the invention, the electrical cable extends along an axis and the screen is placed around the electrical cable coaxially.

In this first embodiment, the magnetic core may be of cylindrical shape and extend about an axis, the screen advantageously protruding from the magnetic core beyond the one or more turns formed around the magnetic core. The protrusion is advantageously at least equal to a characteristic outside dimension of the magnetic core.

The cable may be wound a plurality of times around the magnetic core so as to form a plurality of turns around the magnetic core.

In a second embodiment of an inductive filtering device according to the invention, the screen is placed on at least one face of the magnetic core.

In the second embodiment, the screen may comprise a plurality of portions, each portion being placed so as to cover one of the faces of the magnetic core.

In the second embodiment, the screen may comprise two shells that fit into each other.

The magnetic core may possess a central void and the electrical cable may be wound around the magnetic core in such a way as to pass through the central void.

BRIEF DESCRIPTION OF THE DRAWING

The invention will be better understood and other advantages will become apparent on reading the detailed description of a plurality of embodiments that are given by way of example, the description being illustrated by the appended drawing, in which.

For the sake of clarity, the same elements will bear the same references in the various figures.

DETAILED DESCRIPTION

Figure 1:
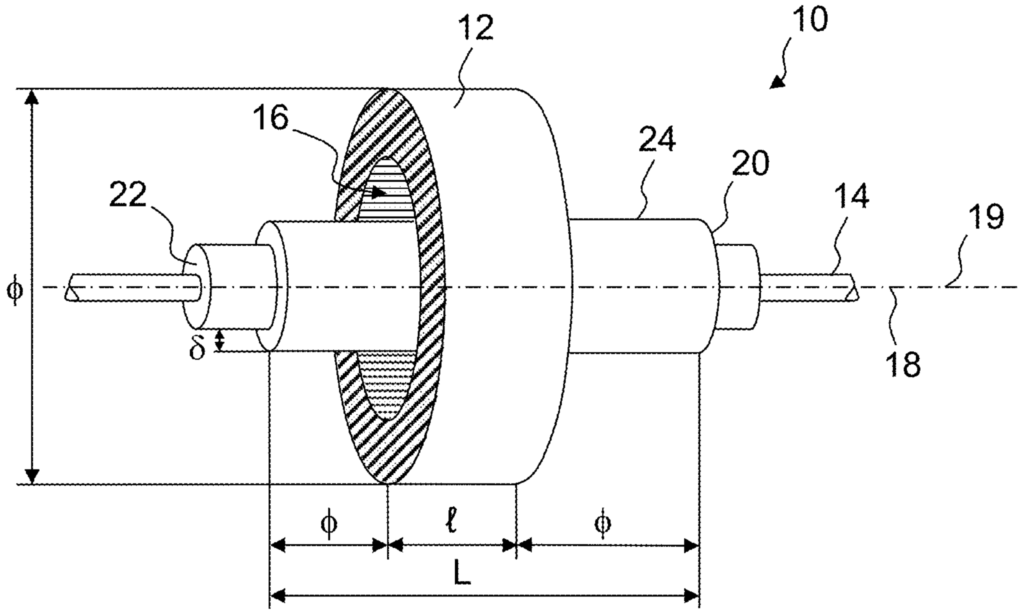
FIG. 1 shows a first variant winding of a cable of a first embodiment of the invention.

FIG. 1 shows an inductive filtering device 10 comprising a magnetic core 12 and an electrical cable 14. In other words, the inductive filtering device 10 forms an inductor. The magnetic core 12 is formed around a central void 16. The magnetic core 12 is of tubular shape and extends about an axis 18. The central void 16 also extends about the axis 18. The magnetic core 12 is closed and for example gapless. In FIG. 1, the magnetic core 12 possesses a circular cross section perpendicular to the axis 18. Other cross sections are possible in the context of the invention, for example a rectangular cross section, a triangular cross section, etc. A circular cross section is very suitable for the passage of an electrical cable 14 also of circular cross section that passes only a single time through the central void. The cable 14 extends along an axis 19. In the case of a single passage, the axes, 18 of the magnetic core 12 and 19 of the cable 14, are substantially coincident to within the functional play between the cable 14 and the central void 16. As will be seen below, the electrical cable 14 may pass a plurality of times through the central void 16. It may then be advantageous to arrange the various passages through the central void 16 so that they occupy a different section of a circular cross section. The shape of the magnetic core 12 may also be guided by the environment of the device 10. It may be easier to provide a device 10 the magnetic core 12 of which is of rectangular cross section.

This type of gapless closed magnetic core is typically referred to as "toroidal" by many manufacturers. This qualifier goes way beyond the shape of a toroid such as defined mathematically. In particular, magnetic cores are found that are said to be toroidal but that are of circular cross section, rectangular cross section, etc. The absence of gap allows the magnetic field generated in the magnetic core 12 to be kept solely in the material of the magnetic core, i.e. to avoid the effect of a gap.

According to the invention, the device 10 comprises an electrically conductive screen 20 placed between the magnetic core 12 and the electrical cable 14. The screen 20 is electrically insulated from the electrical cable 14 and from the magnetic core 12. In the embodiment shown in FIG. 1, the screen 20 is placed around the electrical cable 14. The screen 20 is coaxial with the cable 14. An electrical insulator 22 is placed between the cable 14 and the screen 20. The electrical insulator 22 may be an exterior cladding of the cable 14. Another electrical insulator 24 is placed between the screen 20 and the magnetic core 12. In the embodiment shown in FIG. 1, the insulator 24 covers the screen 20. Alternatively, the insulator 24 may cover the magnetic core 12 and in particular the internal face of the central void 16.

Placement of the screen 20 between the cable 14 and the magnetic core 12 allows currents to flow through the screen 20. These currents are generated by electromagnetic induction as a result of the current flowing through the cable 14.

The device 10 allows a current flowing through the cable 14 to be filtered inductively. This current may be noisy. More precisely, the current flowing through the cable 14 comprises a fundamental frequency and higher frequencies the amplitude of which it is sought to decrease by means of the device 10. In the case of a DC current flowing through the cable 14, the fundamental frequency is zero. The higher frequencies are any AC components superposed on the DC component of the current or on the fundamental AC component in the case where an AC current is flowing through the cable 14. These AC components of frequencies higher than the fundamental frequency may be due to the production of the DC current by means of a rectifier. Specifically, traces of frequencies present upstream of the rectifier are found superposed on the DC current. The undesirable AC components may also be due to rejected currents sent back by the loads fed via the cable 14, or to electromagnetic interference to which the cable 14 may be subjected. In the screen 20, it is mainly the generation of currents induced by the undesirable AC components of the current flowing through the cable 14 that is of interest.

It is possible to tailor the thickness of the screen 20 to the frequencies that it is desired to filter. These frequencies may be far higher than the fundamental frequency. Generally, in a bulk conductor, high-frequency currents flow essentially through the skin of the conductor. Thus, to effectively filter a given frequency and higher frequencies, the thickness $\delta$ of the screen 20 must be at least the thickness of the skin through which the current flows at the given frequency. Beneath this thickness, the given frequency is still filtered, but less effectively. It is possible to make allowance for a margin of safety when determining of the thickness $\delta$ of the screen 20 by choosing a thickness at least equal to two or three times the thickness of the skin through which the current of the given frequency flows. The skin thickness is therefore given by the formula:

$$\delta=(\rho/\pi \cdot f \cdot \mu)^{1/2}$$

with ρ: the resistivity, and μ the absolute magnetic permeability of the material chosen to produce the screen 20.

Along the axis 19 of the cable 14, the screen 20 possesses a finite length L along the axis 19 of the cable 14, which is advantageously longer than the length l of the magnetic core 12 along its axis 18. The fact that the length L of the screen 20 is finite allows the flow in the screen 20 of current in a direction parallel to the axis 19 of the cable 14 to be avoided. Such currents are undesirable because they would oppose the passage of the fundamental frequency through the cable 14 by forming a transformer. In practice, the passage of the cable 14 through the central void 16 may be likened to a turn encircling the magnetic core 2. More precisely, when a current flows through the cable 14, the latter forms a closed circuit with at least one generator and one load. This closed circuit forms a turn around a section of the magnetic core 12, which section is formed in a plane containing the axis 18. Moreover, the flow of a current through the screen 20 parallel to the axis 19 of the cable 14 would form, in the same way, another turn around a section of the magnetic core 12. The turn of the cable 12 and that of the screen would then form the aforementioned transformer, which transformer it is desirable to avoid.

It is possible to set the potential of the screen 20 by electrically connecting it, for example, to an electrical ground of the piece of equipment in which the device 10 is installed. This connection must be made to a single point of the screen 20 in order to avoid the creation, by the screen 20, of a turn around the magnetic core. Alternatively, to simplify the production of the device 10, the screen 20 may be electrically insulated from its environment, i.e. the screen 20 possesses no electrical connection. The potential of the screen 20 is left floating. Internal trials have shown that this complete electrical insulation allows the screen to perform its main function of limiting the heating of the magnetic core 12. In other words, when the device is in operation, the screen 20 is electrically connected neither to the magnetic core 12, nor to the cable 14, nor to any source of potential of the piece of equipment to which the device belongs.

Since the screen 20 encircles the cable 14, currents that rotate around the axis of the cable may be generated therein. Such currents are especially induced by the undesirable AC components of the current flowing through the cable 14.

Since the material from which the magnetic core 12 is formed has properties that enable electrical conduction, in the absence of the screen 20, the undesirable AC components would induce, in the magnetic core 12, currents that would rotate around the central void 16. The presence of the screen 20, in which rotating currents that are induced by the undesirable AC components flowing through the cable 14 are generated, allows the rotating currents in the magnetic core 12 to be attenuated. Specifically, the magnetic core is subjected, via induction, to the currents flowing through the cable 14 and to the opposing currents rotating in the screen 20. This opposition of the currents flowing through the cable 14 and rotating in the screen 20 allows the generation of induced currents in the magnetic core 12 to be limited, this allowing Joule heating thereof to be limited.

Figure 2:
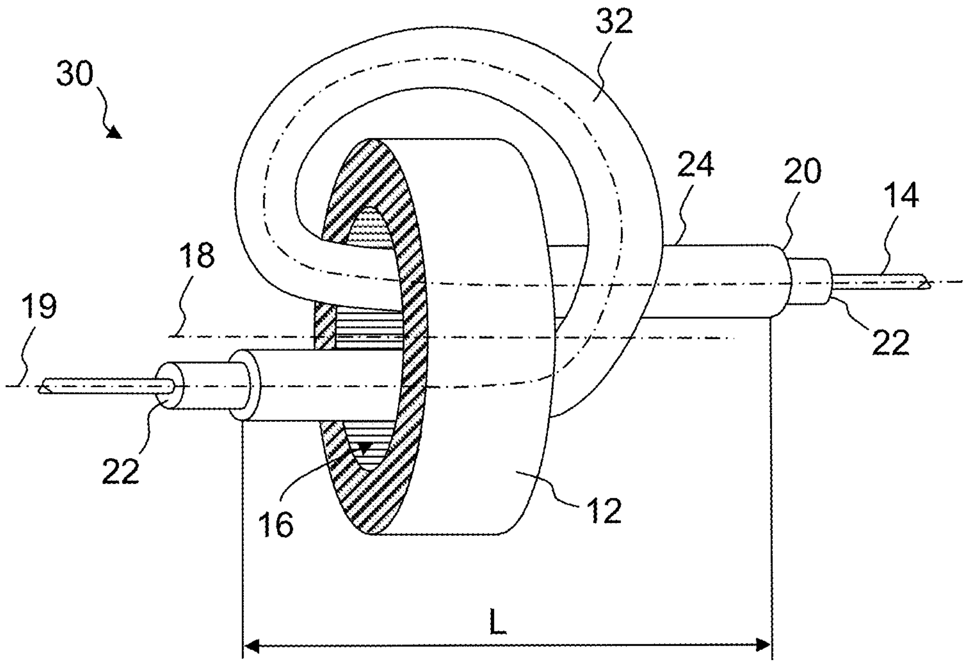
FIG. 2 shows a second variant winding of the cable of the first embodiment of the invention.

FIG. 2 shows one variant of the embodiment of the device 10 shown in FIG. 1. FIG. 2 shows an inductive filtering device 30 that also forms an inductor, in which device the magnetic core 12, the cable 14 and the screen 20 are found. Unlike the device 10, the cable 14 of the device 30 passes two times through the central void 16, thereby forming a second turn 32 around the magnetic core 12. In the context of the invention, it is of course possible to produce as many turns 32 as necessary to achieve the desired filtering. The axis 19 of the cable 14 follows the shape of the turn 32 and the screen 20 here remains coaxial with the cable 14. In other words, the screen 20 follows the axis 19 of the cable 14. The axes 18 and 19 are not coincident. As in the variant of FIG. 1, the screen 20 of the device 30 does not form any turns around the magnetic core 12. The electrical insulator 24 here is advantageous as it prevents short-circuits between the turns formed by the screen 20 around the magnetic core. Specifically, such short-circuits would lead to currents rotating parallel to the current flowing through the cable 14.

The screen 20 possesses a length L defined along the axis 19 of the cable 14. The screen 20 protrudes from the magnetic core 12 on either side of the passage of the cable 14 through the central void 16. Internal trials have shown that, to obtain filtering of optimal effectiveness, it is advantageous for the screen 20 to protrude from either side of the magnetic core 12 along the axis 18. An optimal protrusion is at least equal to a characteristic outside dimension of the magnetic core 12 perpendicular to its axis 18. For example, for a cylindrical magnetic core 12, the protrusion is at least equal to the outside diameter ϕ of the magnetic core 12, as shown in FIG. 1. With such a protrusion, there is almost no longer any induction between the cable 14 and the magnetic core 12. With a magnetic core of tubular shape and of rectangular or square cross section, the characteristic dimension is for example the diagonal of the square or rectangular cross section. More generally, an optimal protrusion is at least equal to a largest characteristic outside dimension of the magnetic core.

As above, in the variant of FIG. 2, the potential of the screen 20 may be set by connecting it electrically for example to an electrical ground of the piece of equipment in which the device 30 is installed. This connection is made to a single point of the screen 20 in order to avoid the creation, by the screen 20, of a turn around the magnetic core 12.

The screen 20 may be produced by means of a metal braid or foil, for example made of an aluminum or copper alloy, that encircles the cable 14. Any other electrically conductive material may of course be employed. It is possible to employ a metallized plastic film. The actual plastic film performs the function of the insulator 24 and the metallization that of the screen 20.

Figure 3:
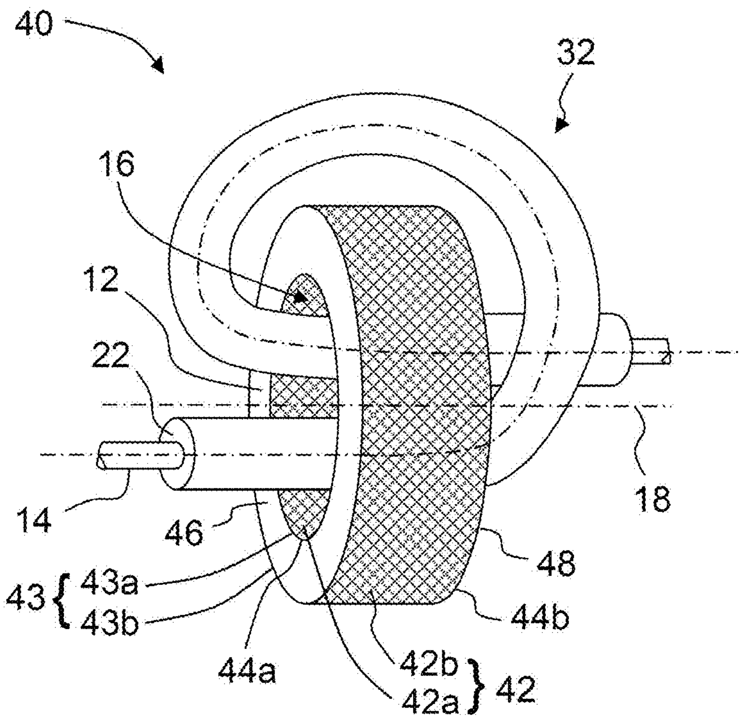
FIG. 3 shows a second embodiment of the invention.

FIG. 3 shows a second embodiment of an inductive filtering device 40 according to the invention. In this embodiment the magnetic core 12 and the cable 14 and its insulator 22 are found. In FIG. 3, the cable 14 forms a turn 32 around the magnetic core 12. The second embodiment may be implemented with as many turns 32 as required or even without any turns 32 as in the variant of FIG. 1. The device 40 comprises a screen 42 placed between the magnetic core 12 and the cable 14. Unlike the devices 10 and 30, the screen 42 is not placed around the electrical cable 14 coaxially. The screen 42 is placed on at least one face of the magnetic core 12. An electrical insulator 43 is interposed between the screen 42 and the magnetic core 12. The electrical insulator 43 performs the function of the electrical insulator 24 present in the first embodiment. The screen 42 and the insulator 43 may be produced by means of a metallized plastic film.

In the embodiment of FIG. 3, the screen 42 comprises two portions 42*a* and 42*b*. The portion 42*a* is placed on an internal face 44*a* of the magnetic core 12 and the portion 42*b* is placed on an external face 44*b* of the magnetic core 12. Likewise, the insulator 43 comprises two portions 43*a* and 43*b*. The portion 43*a* is placed on the internal face 44*a* of the magnetic core 12 and the portion 43*b* is placed on the external face 44*b* of the magnetic core 12. More precisely, the faces 44*a* and 44*b* are concentric with the central void 16. The faces 44*a* and 44*b* possess cylindrical cross sections about the axis 18. The face 44*a* forms an internal wall of the tubular shape of the magnetic core 12 and the face 44*b* forms an external wall of the tubular shape of the magnetic core 12. When the cable 14 passes only a single time through the central void 16, as in the variant of FIG. 1, the portion 42*a* placed on the internal face 42*a* is sufficient and it is not necessary to produce a portion 42*b* on the external face 44*b* to place the screen between the cable 14 and the magnetic core 12. In contrast, when the cable 14 passes a plurality of times through the central void 16 to form one or more turns 32, the portion 42*b* is advantageous with regard to completing the insertion of the screen 42 between the cable 14 and the magnetic core 12.

The magnetic core 12 comprises two faces 46 and 48 that are perpendicular to the axis 18. It is possible to complete the screen 42 and the insulator 43 by covering one, or even both, of the faces 46 and 48. If one of the faces 46 or 48 is covered, the screen 42 will be able to ensure an electrical continuity between the portions 42*a* and 42*b*. In case of coverage of both faces 46 and 48 by the screen 42, it is important to break the electrical continuity of the screen 42 so as to avoid any possibility of current rotating in the screen 42 parallel to the one or more turns produced by the cable 14 passing through the central void 16.

The screen 42 may take the form of a metal braid placed on the faces in question of the magnetic core 12.

There is no need to set the potential of the screen 42. It is therefore possible to keep the screen 42, whether it is made up of a single portion or of a plurality of portions 42*a* and 42*b*, to keep the screen 42 or its various portions completely electrically insulated from their environment.

Figure 4:
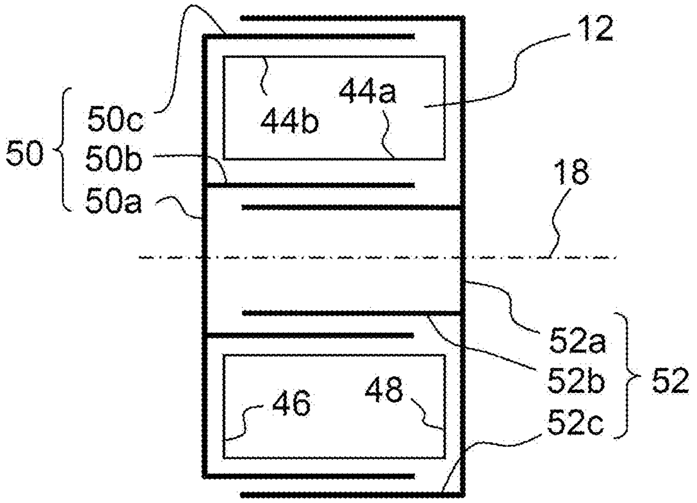
FIG. 4 shows a magnetic core and a screen employed in one variant of the second embodiment of the invention.

FIG. 4 shows one variant of a screen suitable for the second embodiment. In order not to clutter FIG. 4, only the magnetic core 12 and the screen have been shown. The screen is formed from two shells 50 and 52 that fit into each other. The shell 50 comprises a planar face 50*a* making contact with the face 46 of the magnetic core 12. The shell 50 also comprises two cylindrical faces 50*b* and 50*c* that extend along the axis 18 of the magnetic core 12. The cylindrical face 50*b* makes contact with the internal face 44*a* of the magnetic core 12 and the cylindrical face 50*c* makes contact with the external face 44*b* of the magnetic core 12. Likewise, the shell 52 comprises a planar face 52*a* making contact with the face 48 of the magnetic core 12. The shell 52 also comprises two cylindrical faces 52*b* and 52*c* that extend along the axis 18 of the magnetic core 12. The cylindrical face 52*b* makes contact with the cylindrical face 50*b* of the shell 50 and the cylindrical face 52*c* makes contact with the cylindrical face 50*c* of the shell 50. The shells are for example made of machined or molded metal. The planar face and the cylindrical faces of each shell 50 and 52 are electrically continuous. The shells 50 and 52 are covered with an electrical insulator at least between their faces making contact with the magnetic core 12 itself. The electrical insulator also provides insulation between the two shells 50 and 52 in order to avoid the formation of a turn around the magnetic core 12, as mentioned above. The electrical insulator may be formed from a plastic film completely or partially covering each of the shells 50 and 52.

As above, the two half-shells may be completely electrically insulated from their environment.

Figure 5:
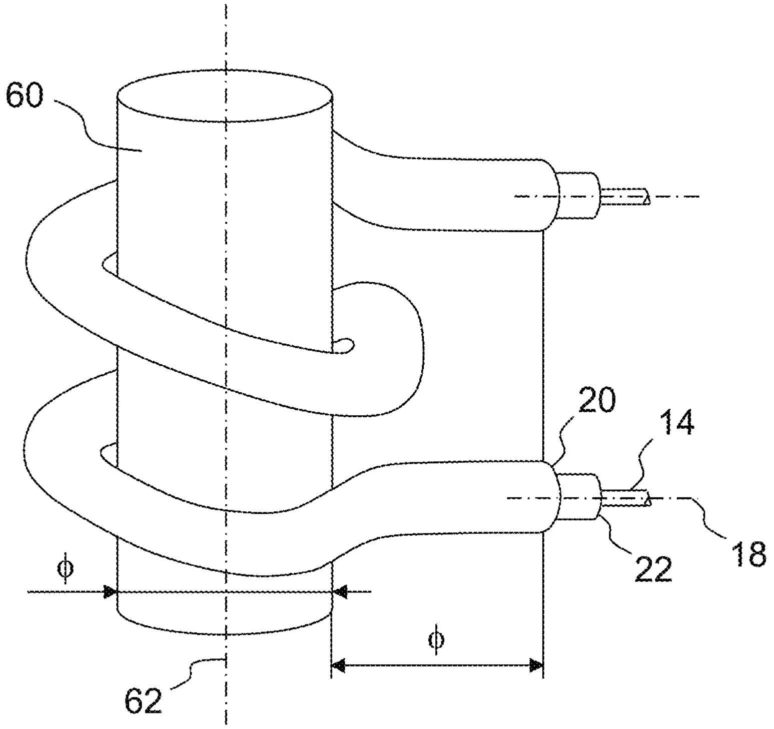
FIG. 5 shows the first embodiment adapted to one magnetic-coil variant.
Figure 6:
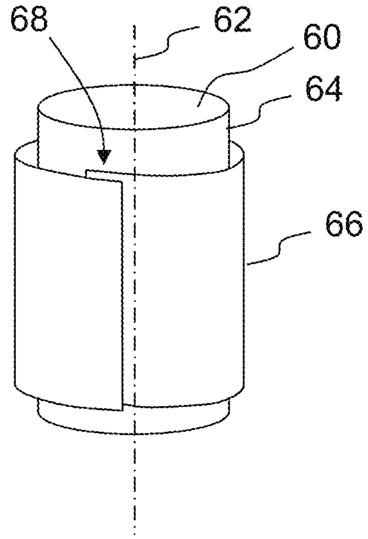
FIG. 6 shows the second embodiment adapted to the magnetic-coil variant of FIG. 5.

FIGS. 5 and 6 show the invention adapted to another form of magnetic core. More precisely, in FIGS. 5 and 6, the magnetic core 60 possesses a slender shape encircled by the cable 14. In the example shown, the magnetic core 60 possesses no void passing through it. Alternatively, it is possible to employ a magnetic core possessing one or more voids, and to wind the cable 14 around this magnetic core in such a way that it does not pass through the one or more voids. The magnetic core 60 possesses a cylindrical shape that extends along an axis 62 and the cross section of which is solid and circular. Any other cylindrically shaped magnetic core is possible, for example one possessing a cross section perpendicular to the axis 62 of square or rectangular shape. The magnetic core 60 may be drilled right through along the axis 62.

In FIG. 5, the cable 14 of FIGS. 1 and 2 encircled by the first insulator 22, the screen 20 and the second insulator 24 may be seen. The cable 14 is wound around the magnetic core 60. The axis 62 forms the winding axis of the cable 14. In FIG. 5, the cable 14 is wound twice around the core. It is of course possible to implement the invention whatever the number of times the cable 14 is wound around the magnetic core 60. In this configuration, the screen 20 decreases the appearance of high-frequency currents in the magnetic core 60, i.e. of currents induced by the high-frequency components present in the signal conveyed by the cable 14. In the example shown in FIG. 5, the screen 20 is placed around the cable 14 coaxially right along the length of the portion of the cable 14 that is wound around the magnetic core 60. As above, it is advantageous for the screen 20 to extend beyond the winding of the cable 14 around the magnetic core 60. In this embodiment, the protrusion of the screen beyond the winding is advantageously at least equal to the diameter $\phi$ of the magnetic core 60. The minimum protrusion is shown in FIG. 5.

With the magnetic core 60, it is possible to produce a screen such as illustrated in FIG. 3, i.e., a screen placed on at least one of the faces of the magnetic core 60. FIG. 6 illustrates a screen 66 encircling the cylindrical face 64 of the magnetic core 60. In order not to clutter the figure, the cable 14 has not been shown. It is wound as in FIG. 5. To avoid generating induced currents in the screen 66, the latter is interrupted substantially along a generatrix of the cylindrical shape of the magnetic core 60. The interruption may take another form, for example that of a helix around the axis 62 of the magnetic core 60 or even along a broken line. It is advantageous for the screen 66 to overlap, i.e. to make more than one complete turn, level with its interruption. Such an overlap 68 may be seen in FIG. 6. To ensure an overlap without electrical contact between the ends of the screen level with its interruption, the screen 66 may be produced by means of a conductive film covered on both its faces with an electrical insulator. On one of the faces, the insulator ensures the insulation of the screen 66 with respect to the magnetic core and on the other face with respect to the screen itself level with the overlap and optionally with respect to the cable 14. Once again, there is no need to electrically connect the screen 66, and the electrical insulator covering it may take the form of a continuous film.

In the various embodiments, the cable 14 has been shown with a single electrical conductor passing through the magnetic core 12. It is entirely possible to implement the invention with a cable 14 comprising a plurality of electrical conductors that are insulated from one another. The conductors are then intended to carry different electrical voltages, for example the positive voltage and the negative voltage of the output of a DC power supply or the phase and neutral of a single-phase AC power supply. It is also possible to make provision for there to be two electrical conductors grouped together in the same cable, for example with a view to filtering the various phases output by a polyphase AC power supply.

The invention claimed is:

1. An inductive filtering device comprising:

a magnetic core, at least one electrical cable wound around the magnetic core so as to form at least one turn, the electrical cable being intended to convey an electrical signal possessing at least one undesirable AC component superposed on a fundamental frequency of the electrical signal, and an electrically conductive screen that is electrically insulated from its environment, the screen being placed between the magnetic core and the electrical cable so as to allow, in the screen, via electromagnetic induction, a current to be generated the frequency of which is higher than the fundamental frequency, the screen being configured so as not to allow the current to flow in a direction parallel to that of the one or more turns formed by the winding of the electrical cable around the magnetic core, and the device being intended to filter a given frequency, wherein the screen has a thickness at least equal to $\delta=(\rho/\pi\cdot f\cdot\mu)^{1/2}$ with ρ: the resistivity, and μ: the absolute magnetic permeability of the material chosen to produce the screen.

2. The inductive filtering device as claimed in claim 1, wherein the magnetic core possesses a central void, and wherein the electrical cable is wound around the magnetic core in such a way as to pass through the central void.

3. The inductive filtering device as claimed in claim 1, wherein the electrical cable extends along an axis and wherein the screen is placed around the electrical cable coaxially.

4. The inductive filtering device as claimed in claim 3, wherein the magnetic core is of cylindrical shape and extends about an axis, and wherein the screen protrudes from the magnetic core beyond the one or more turns formed around the magnetic core, the protrusion being at least equal to a characteristic outside dimension of the magnetic core.

5. The inductive filtering device as claimed in claim 1, wherein the cable is wound a plurality of times around the magnetic core so as to form a plurality of turns around the magnetic core.

6. The inductive filtering device as claimed in claim 1, wherein the screen is placed on at least one face of the magnetic core.

7. The inductive filtering device as claimed in claim 6, wherein the screen comprises a plurality of portions, each portion being placed so as to cover one of the faces of the magnetic core.

8. The inductive filtering device as claimed in claim 6, wherein the screen comprises two shells that fit into each other.

* * * * *